(12) United States Patent
Bartov et al.

(10) Patent No.: US 9,518,859 B2
(45) Date of Patent: Dec. 13, 2016

(54) SYSTEM AND METHOD FOR CONTENT ESTIMATE BASED DETECTION OF OBSTACLES WITHIN A BIN

(71) Applicants: Avishai Bartov, Hod-Hasharon (IL); Yossi Zlotnick, Ramat-Hasharon (IL)

(72) Inventors: Avishai Bartov, Hod-Hasharon (IL); Yossi Zlotnick, Ramat-Hasharon (IL)

(73) Assignee: APM AUTOMATION SOLUTIONS LTD, Tel Aviv (IL)

( * ) Notice: Subject to any disclaimer, the term of this patent is extended or adjusted under 35 U.S.C. 154(b) by 931 days.

(21) Appl. No.: 13/752,406

(22) Filed: Jan. 29, 2013

(65) Prior Publication Data

US 2014/0214361 A1    Jul. 31, 2014

(51) Int. Cl.
*G01F 23/296*    (2006.01)

(52) U.S. Cl.
CPC ................. *G01F 23/2962* (2013.01)

(58) Field of Classification Search
CPC .................................... G01F 23/2962
USPC .......................................... 702/167
See application file for complete search history.

(56) References Cited

U.S. PATENT DOCUMENTS

| | | | |
|---|---|---|---|
| 8,091,421 B2* | 1/2012 | Perl ..................... | G01F 23/2962 73/290 V |
| 2014/0214360 A1* | 7/2014 | Bartov ................ | G01F 23/2962 702/167 |

* cited by examiner

*Primary Examiner* — Bryan Bui
(74) *Attorney, Agent, or Firm* — Reches Patents (57) ABSTRACT

A method and a system for automatically mapping obstacles within a bin that stores content, the system may include a location estimator that is arranged to calculate, in response to detection signals, multiple estimates of shapes of the upper surface of the content at different time periods; wherein the detection signals are generated by a receiver in response to radiation signals reflected or scattered within the bin; and an obstacle detector that is arranged to detect an obstacle in response to relationships between the multiple estimates of shapes of the upper surface of the content.

23 Claims, 7 Drawing Sheets

SYSTEM AND METHOD FOR CONTENT ESTIMATE BASED DETECTION OF OBSTACLES WITHIN A BIN

BACKGROUND OF THE INVENTION

The present invention relates to monitoring of inventory and to process measurement, and, more particularly, to a system and method for measuring the content of a bin.

The monitoring of liquid inventory generally is straightforward. By contrast, the monitoring of bulk solid inventory that consists of particulates piled up inside a bin such as a silo often is very difficult. Examples of such bulk solid inventory include cement and sand for construction, grain, fertilizer, etc. The measurement of the level of bulk materials inside a bin is a problem that has not yet been solved adequately. The conditions inside bins typically are unfavorable (dust, extreme temperatures, etc.) and the contents of the bulk material stored in the bins often do not have a flat surface and are not always isotropic. Other difficulties arises from the wide variety of bin shapes in use and from the explosive atmospheres inside some bins.

The scope of the term "bin" as used herein includes any storage container, for bulk particulate solids, whose structure defines an interior volume for receiving and storing the solids. Such a bin may be closed above, below and on all sides, as is the case when the bin is a silo, vessel or tank, or may be open above or on one or more sides. The example of a "bin" that is used in the detailed description of the present invention below is a silo; but it will be obvious to those skilled in the art how to apply the principles of the present invention to any type of bin.

Five principal methods are known for continuous measurement of the content of a bin such as a silo.

An electromechanical (yo-yo) level sensor consists essentially of a weight at one end of a reel of tape. The weight is allowed to descend in the silo to the depth at which the top surface of the content is situated. When the weight settles on top of the content, the tension in the tape slackens. The weight then is retracted to the top set point. The height of the content is inferred from the time required to retract the weight or from the measured tape length.

Mechanical devices such as yo-yo sensors are unreliable. They tend to get clogged by dust and to get stuck on obstacles such as pumps and rods inside the silos.

Ultrasonic level sensors work on the principle of ultrasonic sound wave transmission and reception. High frequency sound waves from a transmitter are reflected by the top surface of the content to a receiver. The height of the content is inferred from the round-trip travel time. Such sensors have limited range and work poorly in the presence of dust. In addition, such devices need to be custom-designed for different types of silo.

Radar level sensors work on the principle of electromagnetic wave transmission and reception. Electromagnetic waves from a transmitter are reflected by the top surface of the content to a receiver. The height of the content is inferred from the round-trip travel time. Such sensors are have a single point of measurement that is not suited for bulk solids.

Capacitance sensors measure the capacitance between two metallic rods or between a metallic rod and the ground. Because the silo content has a different dielectric constant than air, the capacitance changes according to the level of the top surface of the content between the two rods or between a rod and the ground. Such sensors tend to be inaccurate and are sensitive to humidity and to type of material stored in the silo.

All the prior art sensors discussed above are insensitive to the shape of the contents, and so are inaccurate in the presence of a common phenomenon called "coning" that occurs as bulk particulate solids are withdrawn via the base of a bin: an inverted conical hole, whose apex is directly above the point of withdrawal, tends to form in the bulk particulate solids. A similar phenomenon occurs as bulk particulate solids are added to a bin from the top: the solids tend to pile up in a cone whose apex is directly below the point of insertion of the solids. These sensors also work poorly in bins with complicated geometries and in the presence of obstacles.

A weight gauge measures the weight of a mobile silo and its content by measuring the tension in the rods that hold the silo. Installation of such gauges is complex, and they are suitable only for mobile silos with metallic legs.

One of the main issues in measuring the contents of a bin (bulk solids or liquids) is false echoes.

False echoes results from an illumination of obstacles within the bin. These obstacles can be foreign objects, irregularities on the bin walls, build up of content material and even corrugations). Content material can, for example, accumulate on an obstacle or on the bin wall.

When material level is bellow these obstacles—the level measurement device might lock on the obstacles and consider them as the actual material level.

The location of these obstacles and their sizes is different in every bin and therefore they cannot be eliminated prior to installation in a generic robust way for all vessels.

A known way to cope the false echoes problem is to wait till the bin is empty of contents (after level measurement device is installed) and then map (record) manually all the echoes the device detect that come from distances that are smaller than the vessel bottom. In more general sense the mapping can be done till a given known material level (that might be above the bottom).

There are few major problems with this method:
a. Manual mapping requires some technical understanding of the device operation (which makes the installation easy to use).
b. Manual mapping requires the knowledge of the contents level at a given time (which is actually why the device was installed in the first place).
c. At some cases the vessel will be emptied only a long time after installation which prolongs the completion of installation
d. Build ups of bulk solids create obstacles that grow over time and thus no manual mapping can eliminate them in advance.

There is thus a widely recognized need for, and it would be highly advantageous to have, a method of measuring the content of a bin and especially detect obstacles and would overcome the disadvantages of presently known methods as described above.

SUMMARY OF THE INVENTION

There are provided systems and methods for automatic mapping of obstacles—even without human interference after installation.

The system and method may scan all the distances shorter than the distances at which the contents was detected and map all the obstacles at these distances.

The automatic detection of obstacles may be based on at least one of the following methods:

Using an array based level measurement a system can detect time of arrival and direction-of-arrival of radiation pulses is used. Such a system can detect multiple points on the surface simultaneously.

If a maximal repose angle of the content is assumed, then when the contents level reduces enough, the calculated angle between an obstacle and the upper surface of the content will be larger than the given maximal possible repose angle of the contents.

When it happens, it is obvious that one of the echo is false (resulting from an obstacle). The decision which one of the echoes is false may be based on the relative power of each of the echoes, the direction of arrival, signal to noise ratio of each echo, the relative distance from which it was detected and other parameters.

Depending on the content surface, at some conditions the false echo might be chosen and on other cases the echo from the contents is very strong and clear (for example usually the echo from the bottom of an empty vessel is usually very strong). In that the algorithm can map the false echo caused by obstacle and it will not affect measurements in future.

Yet according to another embodiment of the invention the echo history may be saved and used to detect obstacles.

In this case each detected echo history is recorded—also for echoes that were detected but disregarded because were considered false.

Real echoes coming from the surface of the content will move as the contents empties or fills into the vessel, while false echoes remain static.

The recognition of false echoes can be then based on the fact that algorithm detected a continuously moving echo while other echoes remained static.

According to an embodiment of the invention there may be provided a system for automatically mapping obstacles within a bin that stores content, the system may include: a location estimator that is arranged to calculate, in response to detection signals, multiple estimates of shapes of the upper surface of the content at different time periods; wherein the detection signals are generated by a receiver in response to radiation signals reflected or scattered within the bin; and an obstacle detector that is arranged to detect an obstacle in response to relationships between the multiple estimates of shapes of the upper surface of the content.

The obstacle detector may be arranged to define an obstacle as an area that remains substantially unchanged at a plurality of estimates despite substantial differences of other areas of the plurality of; wherein the multiple estimates comprise the plurality of estimates. The substantial differences may include differences that represent height differences of the same points over time (having the same x and y coordinates) by at least one meter, by at least 50 centimeters, by at least a predetermined portion (for example—at least 10%, 50% and the like) of the estimated height of same points over time.

The location estimator may be arranged to update the multiple estimates by ignoring detection signals representative of the obstacle.

The obstacle detector may be arranged to re-evaluate a definition of an area as an obstacle and to update at least one of the multiple estimates by an inclusion of detection signals representative of the obstacle if it is determined that the definition of the area as an obstacle was erroneous.

The obstacle detector may be arranged to detect an addition of content to the bin and may be arranged to detect an obstacle as an area that remains unchanged despite the addition of the content.

The obstacle detector may be arranged to detect a removal of content from the bin and may be arranged to detect an obstacle as an area that remains unchanged despite the removal of the content.

The system may include the receiver.

The detection signals may be echoes of acoustic pulses.

According to an embodiment of the invention there may be provided a method for automatically mapping obstacles within a bin that stores content, the method may include: calculating, by a location estimator, in response to detection signals, multiple estimates of shapes of the upper surface of the content at different time periods; wherein the detection signals are generated by a receiver in response to radiation signals reflected or scattered within the bin; and detecting, by an obstacle detector, an obstacle in response to relationships between the multiple estimates of shapes of the upper surface of the content.

The method may include defining an obstacle as an area that remains substantially unchanged at a plurality of estimates despite substantial differences of other areas of the plurality of estimates; wherein the multiple estimates comprise the plurality of estimates.

The method may include updating the multiple estimates by ignoring detection signals representative of the obstacle.

The method may include re-evaluating a definition of an area as an obstacle; and updating at least one of the multiple estimates by an inclusion of detection signals representative of the obstacle if it is determined that the definition of the area as an obstacle was erroneous.

The method may include detecting an addition of content to the bin and may be arranged to detecting an obstacle as an area that remains unchanged despite the addition of the content.

The method may include detecting a removal of content to the bin and detecting an obstacle as an area that remains unchanged despite the addition of the content.

The method may include receiving the detection signals.

The method wherein the detecting signals are echoes of acoustic pulses.

According to an embodiment of the invention there may be provided a system for automatically mapping obstacles within a bin that stores content, the system may include: a transmitter that may be arranged to direct radiation pulses towards an interior of the bin at different points of time during an content changing process selected out of an emptying process of the content and a filling process of the content; a receiver that may be arranged to receive echoes of the radiation pulses and to generate detection signals that are indicative of a time of arrival and of a direction of arrival of the echoes; and an obstacle detector that may be arranged to detect an obstacle in response to a reception of echoes of radiation pulses that are have substantially a same time of arrival and a same direction of arrival throughout the content changing process.

The radiation pulses may be acoustic pulses.

The system may include a location estimator that may be arranged to calculate, in response to detection signals, estimated shapes of an upper surface of the content at different points in time of the content changing process.

According to an embodiment of the invention there may be provided a method for automatically mapping obstacles within a bin that stores content, the method may include: directing, by a transmitter, radiation pulses towards an interior of the bin at different points of time during an content changing process selected out of an emptying process of the content and a filling process of the content; receiving, by a receiver, echoes of the radiation pulses;

generating, by the receiver, detection signals that are indicative of a time of arrival and of a direction of arrival of the echoes; and detecting, by an obstacle detector, an obstacle in response to a reception of echoes of radiation pulses that are have substantially a same time of arrival and a same direction of arrival throughout the content changing process.

The radiation pulses may be acoustic pulses.

The method may include calculating, in response to detection signals, estimated shapes of an upper surface of the content at different points in time of the content changing process.

Any of the stages of any of the methods may be executed by a computerized system that executes instructions stored in a computer readable medium.

According to an embodiment of the invention there is provided a non-transitory computer readable medium that stores instructions to be executed by a computerized system, the instructions are for: calculating, by a location estimator, in response to detection signals, multiple estimates of shapes of the upper surface of the content at different time periods; wherein the detection signals are generated by a receiver in response to radiation signals reflected or scattered within the bin; and detecting, by an obstacle detector, an obstacle in response to relationships between the multiple estimates of shapes of the upper surface of the content

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

The present invention is of a system for measuring the quantity of material stored in a bin such as a silo, Open bin, Dome etc. Specifically, the present invention can be used to monitor inventory in a silo.

The principles and operation of content measuring according to the present invention may be better understood with reference to the drawings and the accompanying description.

Figure 1:
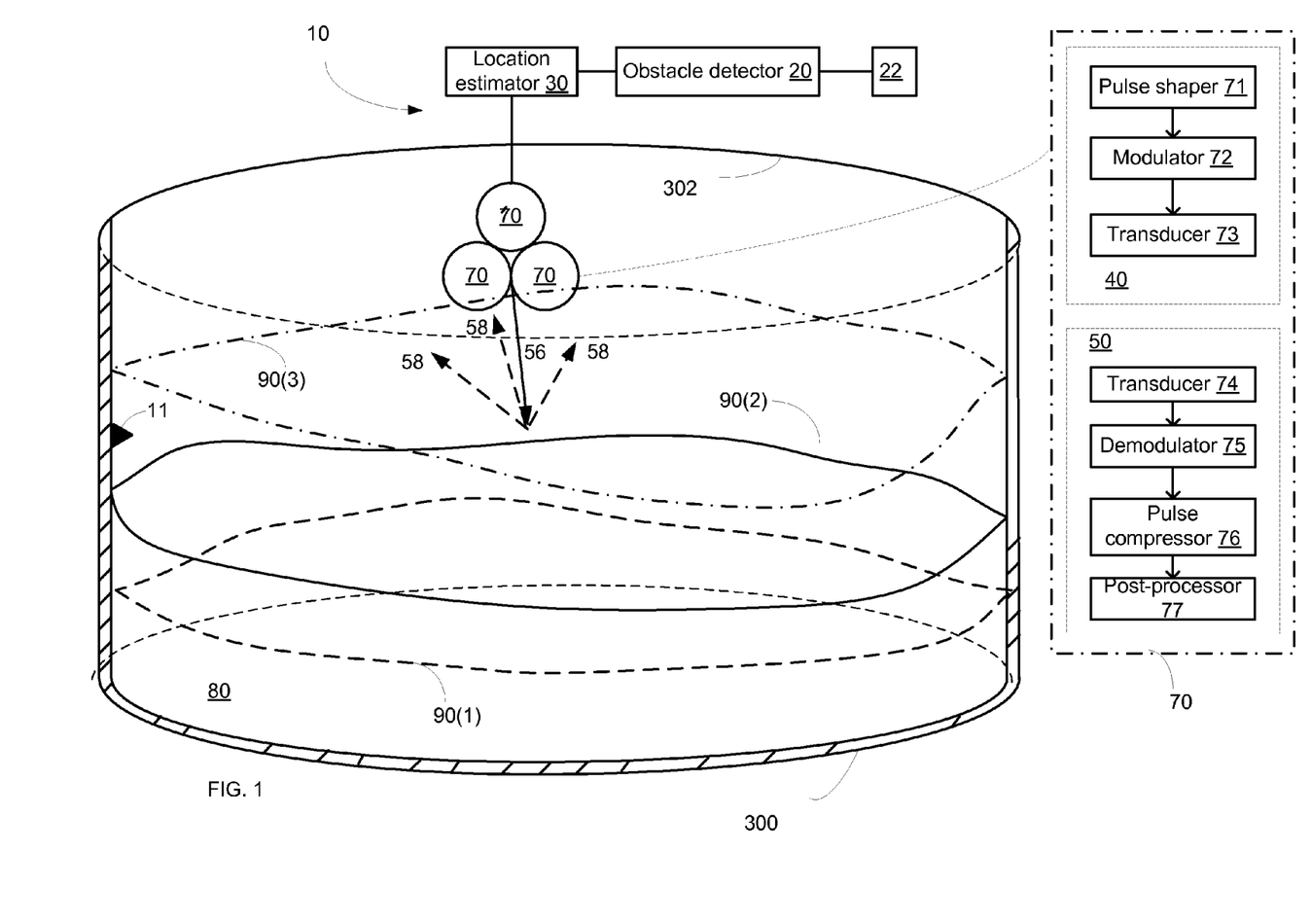
FIG. 1 is a partially cut-away view of a silo with a system mounted on the ceiling of the silo according to an embodiment of the invention.

FIG. 1 is a partially cut-away view of a silo 300 with system 10 mounted on the ceiling 302 of silo 300 and facing an upper surface of content 80 at three points of time during a content changing process (filling content or emptying process), according to an embodiment of the invention. The upper surface at these different points of time is denoted 90(1), 90(2) and 90(3) respectively, whereas upper surface 90(1) is lower than upper surface 90(2) and upper surface 90(2) is lower than upper surface 90(3).

Obstacle 11 is positioned between upper surfaces 90(3) and 90(2).

System 10 may operate without knowing in advance the shape and dimensions of the silo 300 and in this sense it is an autonomous system and can learn over time the shape and dimensions of the silo. The system 10 can, for example, define the bottom of the silo 300 as a set of points that were estimated to have the lowest estimated height out of points illuminated by the system 10 over time.

System 10 can detect obstacles without having prior knowledge on the location and size of these obstacles by applying various methods that are illustrated in the specification.

Alternatively, the system 10 may receive at least partial information about the silo—for example its dimensions—or at least its cross section dimensions System 10 includes location estimator 20 and obstacle detector 30. It may also include one or more receivers and transmitters—such as receiver 50 and transmitter 40. In FIG. 1 the receiver 50 and the transmitter 40 are illustrated as belonging to a transceiver 70—but they may not form such a transceiver.

FIG. 1 illustrates a transmitter and a receiver that are implemented by three non-collinear acoustic transceivers 70. A non-limiting example of such acoustic transceivers is illustrated in U.S. Pat. No. 8,091,421 which is incorporated herein by reference.

The transmitter 50 may be arranged to transmit pulses of acoustic energy that may might be wide enough to cover, without scanning relatively large areas of the upper surface of the content—in comparison to much narrower areas that can be covered by narrow cross section radio frequency or narrow cross section (aperture of about 10 degrees) ultrasonic waves.

It is further noted that the invention can be applicable mutatis mutandis to large (aperture of about 60-80 degrees) cross section radio frequency pulses (for example about 1 Ghz radio frequency pulses) or to scanning systems using radio frequency or scanning systems using ultrasonic waves. The pulses of acoustic energy can have a frequency between 2-7 Hertz.

It is noted that the number of transceivers can differ from three and that radio frequency and ultrasonic radiation can be used.

Each acoustic transceiver 70 may include a transmission path and a reception path. The transmission path (transmitter—denoted 40) may include a pulse shaper 71, a modulator 72 and a transducer (speaker) 73 while the reception path (receiver—denoted 50) can include a transducer (microphone) 74, a demodulator 75, a pulse compressor 76 and a post processor 77 such as those illustrated in U.S. patent application titled "Variable length ranging and direction-finding signals constructed from beamlimited kernals and sparse spreading sequences", having a Ser. No. 13/041,461 filing date Mar. 7, 2011 which is incorporated herein by reference.

Pulse shaper 71 generates a baseband pulse from a kernel. Modulator 72 modulates a carrier wave with the baseband pulse. Transducer 73 launches modulated carrier wave, into a medium that supports propagation of the carrier wave, as a transmitted acoustic pulse 56, towards the upper surface (90(1), 90(2) and 90(3)) of the content.

Echo 58 is reflected from the upper surface (90(1), 90(2) and 90(3)) and received by transducers 74. Demodulator 75 demodulates the echo to provide a received representation of the baseband pulse.

Pulse compressor 76 compresses the representation of the baseband pulse by de-convolution. The pulse compression provides a compressed pulse that is a time-shifted representation of the original kernel. Post-processor 77 applies post-processing the compressed pulse and infers the range to multiple points of the upper surface (90(1), 90(2) and 90(3)) as one-half of the product of the round-trip travel time of acoustic pulse 56 and echo 58.

The directional information is obtaining by using different combinations of transceivers 70 to transmit acoustic pulses and receive echoes.

One or more transceivers 70 may function at any given point of time as transmitters and may emit a pulse of acoustic energy (acoustic pulse) 56 towards the upper surface (90(1), 90(2) and 90(3)) of content 80 of silo 300.

Acoustic pulse 56 is represented symbolically in FIG. 1 as an arrow emerging from one of transceivers 70. An echo of acoustic pulse 56 that is reflected from upper surface (90(1), 90(2) and 90(3)) back towards transceivers 70 is represented in FIG. 1 by dashed arrows 58.

Echo 58, that is received by transceivers 70 functioning as receivers, that in turn are capable of generating detection signals representative of the shape of the upper surface (90(1), 90(2), 90(3)) of content 80 at three points in time.

The detection signals may be responsive to the time of arrival of the echo, relationships between time of arrival of the echo to different transceivers, and the spatial arrangement of the transceivers.

FIGS. 2A-2C and 4 are cross sectional views that illustrate a transceiver 70 of the system 10 of FIG. 1, the silo 300, radiation pulses and echoes (collectively denoted 57) as well as the content at three points of time during a content changing process, according to various embodiments of the invention.

Figure 3A:
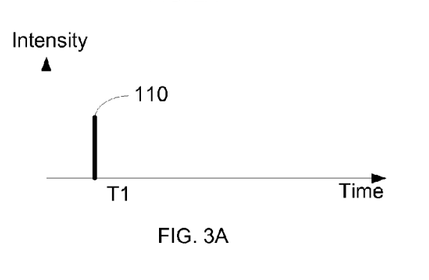
FIGS. 3A-3C illustrate various echoes obtained at three point of time during a content changing process, according to various embodiments of the invention.
Figure 3B:
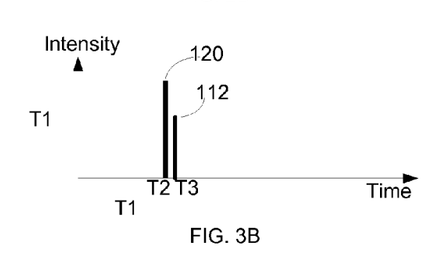
Figure 3C:
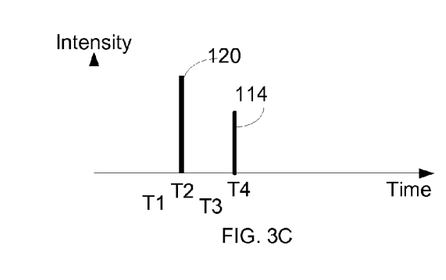

FIGS. 3A-3C illustrate various echoes obtained at three point of time during a content changing process, according to various embodiments of the invention.

Figure 2A:
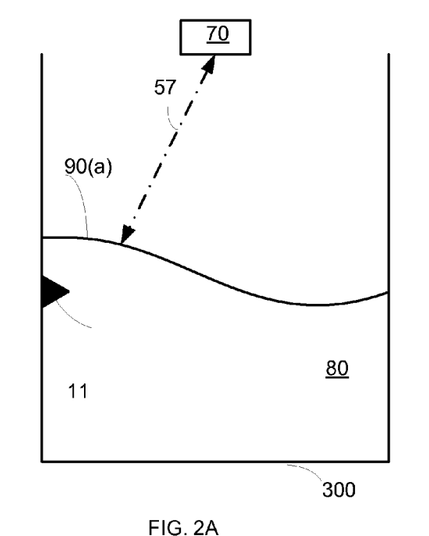
FIGS. 2A-2C and 4 are cross sectional views that illustrate a transceiver of the system of FIG. 1, the silo, radiation pulses and echoes as well as the content at three point of time during a content changing process, according to various embodiments of the invention.

In FIG. 2A the obstacle 11 is located below upper surface 90(a) and is concealed by content 80. Upper surface 90(a) is illuminated by one or more acoustic pulses and reflects echoes toward transceiver (as illustrated by dashed arrow 57). FIG. 3A illustrates a first content echo 110 that represents echo 57 of FIG. 2A. The first content echo 110 is received at time of arrival T1 by transceiver 70. Multiple points of the upper surface 90(a) are illuminated by the acoustic pulses.

Figure 2B:
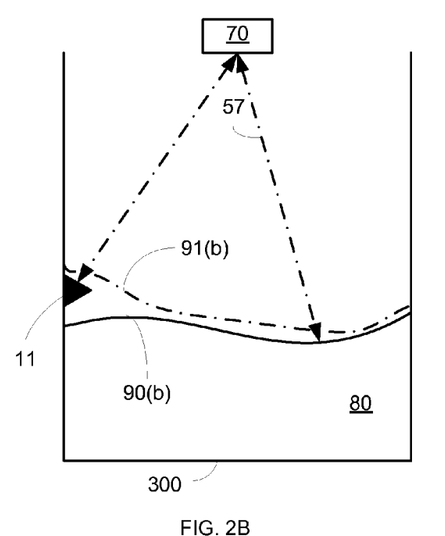

In FIG. 2B the obstacle 11 is located slightly above upper surface 90(b) and it can be viewed as belonging to content 80.

The upper surface 90(b) and obstacle 11 are illuminated by one or more acoustic pulses and they reflect echoes toward transceiver (as illustrated by dashed arrows 57). Multiple points of the obstacle 11 and the upper surface 90(b) are illuminated by the acoustic pulses.

An estimate 91(b) of the upper surface 90(b) can be influenced by obstacle 11 and by the (real) upper surface 90(b). FIG. 3B illustrates an obstacle echo 120 and a second content echo 112 that represent echoes 57 of FIG. 2B. The second content echo 112 is received at time of arrival T3 by transceiver 70, wherein due to the change in the volume of content 80 between FIGS. 2A-2B, differs from time of arrival T1.

Figure 2C:
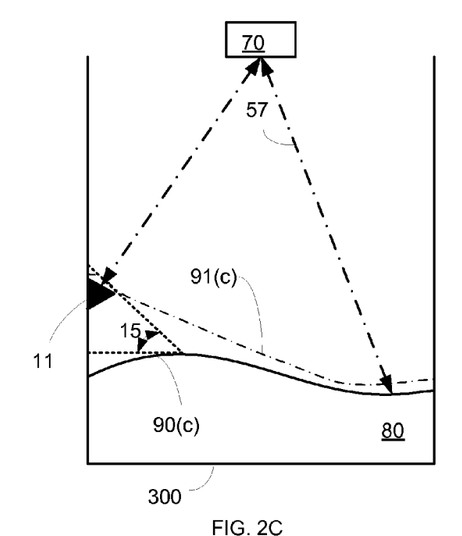
Figure 4:
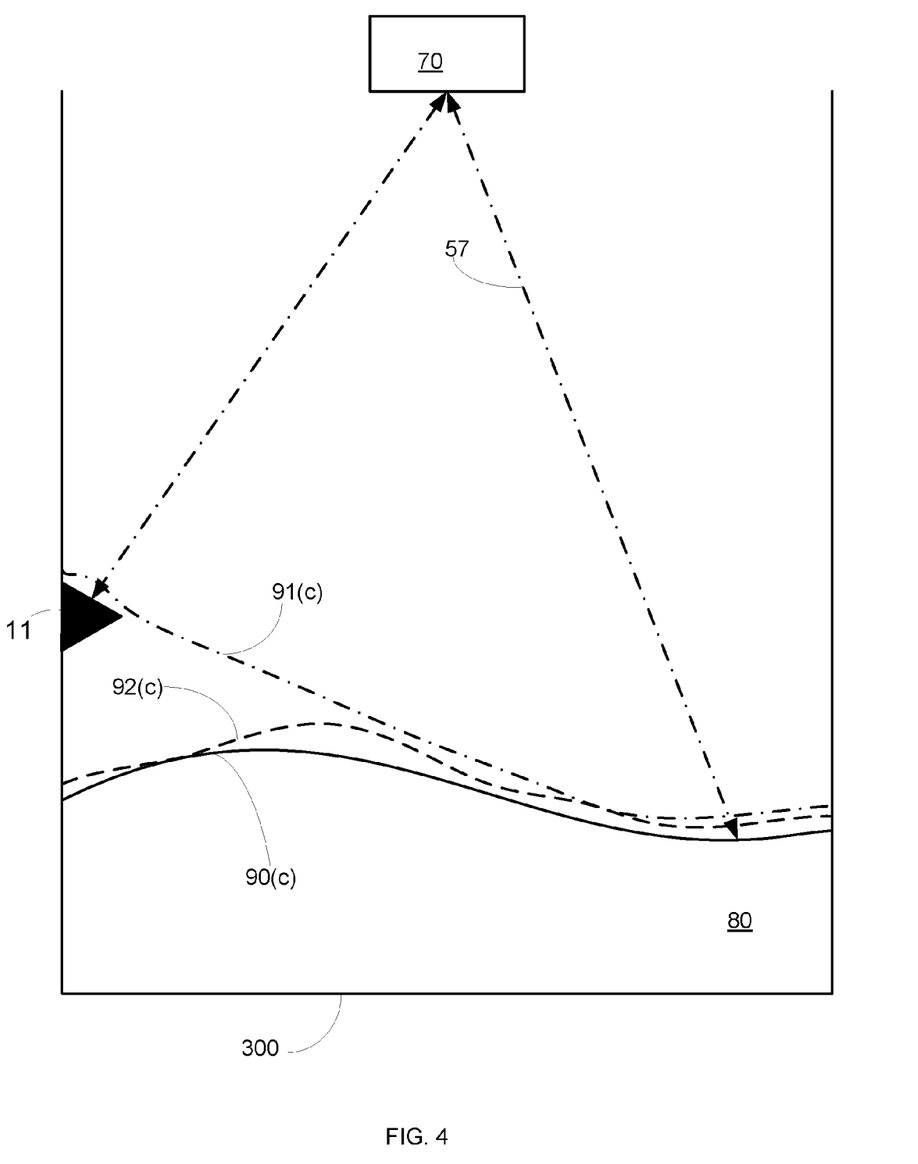

In FIGS. 2C and 4 the obstacle 11 is located at a substantial distance from upper surface 90(c). Due to the substantial distance the angle (15) formed between obstacle 11 and one or more points of upper surface 90(c) exceed an allowable angle and thus the obstacle 11 can be detected and be separated from the upper surface 90(c).

FIG. 4 illustrates an estimate 91(c) of the upper surface 90(c) before the obstacle 11 is detected as an obstacle and an amended estimate 92(c) of the upper surface 90(c) after detecting the obstacle 11 and ignoring it.

FIG. 3B illustrates an obstacle echo 120 and a third content echo 112 that represent echoes 57 of FIG. 2C. While obstacle echo 120 is received at the same point of time (T2)

the third content echo 114 is received at time of arrival T3 by transceiver 70, wherein due to the change in the volume of content 80 between FIGS. 2A-2C, T3 differs from T1 and T2.

Referring back to FIG. 1—the location estimator 20 may be arranged to calculate, in response to detection signals, an estimated shape of an upper surface of the content.

The obstacle detector 30 may be arranged to detect at least one obstacle point that belongs to an obstacle in response to (a) the estimated shape of the upper surface of the content, and (b) an expected shape attribute of the upper surface of the content.

The expected shape attribute may define a maximal expected slope of the upper surface of the content. Referring to FIG. 2C—obstacle 11 is detected as forming an angle 15 that exceeds the allowable angle. Angle 15 is defined between an imaginary oriented line and an imaginary horizontal line. The imaginary oriented line can define a local slope and may pass through a group of points within the bin. The obstacle 11 may be detected by selecting, by obstacle detector 20, out of the group of points, one or more obstacle points that belong to an obstacle—especially the higher points. An obstacle point may be a point of the obstacle that may reflect or scatter an echo that is received by the transceiver 70. Additionally or alternatively, an obstacle point can be an estimated point that may be a part of the estimate of the upper surface of the content that will be regarded as belonging to an obstacle 11 (see for example—the leftmost points of curve 91(c) of FIG. 4).

It is noted that the expected shape attribute can also refer to the roughness of the upper surface, to the presence (or lack of presence) of edges (obstacle 11 can have much sharper edges than content), and the like.

Yet according to an embodiment of the invention the obstacle detector 20 may be arranged to select the one or more obstacle points in response to strengths of reflections from the points of the group of points.

FIG. 1 also illustrates a shape attribute update module 22 that may be arranged to update the expected shape attribute in response to the estimated shape of the upper surface of the content. Thus—after a long enough period of time (for example—one or more weeks, one or more months and the like) the shape attribute update module 22 can update the shape attribute based upon the various estimated of the upper surface of the content that were obtained over time. It can, for example, reduce the maximal expected slope—if neither one of the slopes estimated during the long time period exceeded a predefined portion of the maximal expected slope.

According to various embodiments of the invention (a) the location estimator 30 is arranged to calculate, in response to detection signals, multiple estimates of shapes of the upper surface of the content at different time periods. The detection signals are generated by a receiver in response to radiation signals reflected or scattered within the bin, and (b) the obstacle detector 30 is arranged to detect an obstacle in response to relationships between the multiple estimates of shapes of the upper surface of the content.

The location estimator 30 may, based upon changes in its estimates over time to detect an addition of content to the bin or a removal of content from the bin.

Especially, the obstacle detector 20 may be arranged to define an obstacle as an area that remains substantially unchanged at a plurality of estimates despite substantial differences of other areas of the plurality of estimates; wherein the multiple estimates comprise the plurality of estimates.

Figure 5:
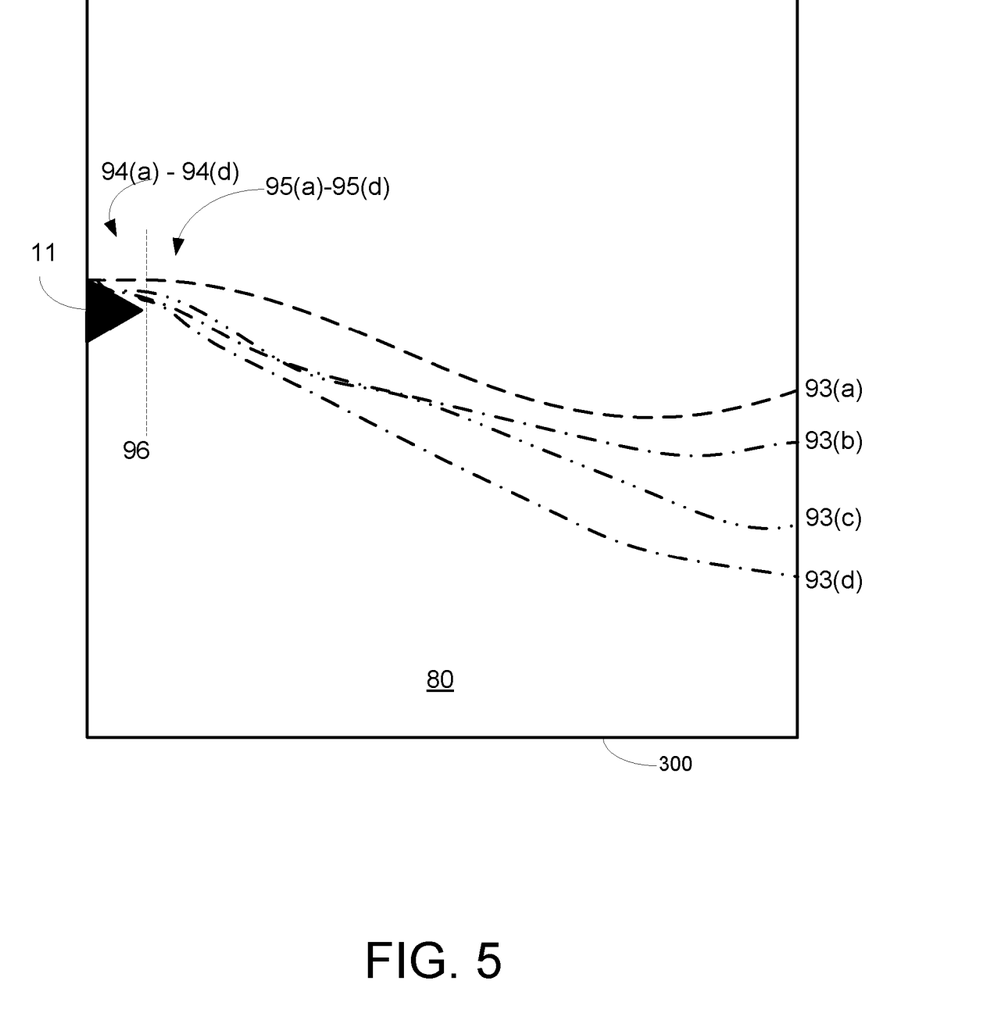
FIG. 5 illustrates a silo, an obstacle and various estimates of the upper surface of the content as obtained at different points of time.

FIG. 5 illustrates different estimates 93(a)-93(d) of the upper surface of the content 80 hat were obtained at different point of time during a content changing process. The obstacle 11 remains unchanged while the volume of the content 80 and its upper surface change dramatically over time.

The obstacle 11 is stationary and the left areas 94(a)-94(d) of estimates 93(a)-93(d) remain substantially unchanged. On the other hand—the right areas 95(a)-95(b) follow the changes in the content over time. Left and right areas are separated by virtual line 96.

The obstacle detector 20 may determine that areas 94(a)-94(d) of the estimates 93(a)-93(d) are attributed to obstacle 11 and may ignore these areas=and update the estimates—as illustrated by updated estimate 92(c) of FIG. 4.

It is noted that the system 100 may store information about objects that were classified as obstacles or otherwise determined to include false information (false echoes) and may re-evaluate the classification when new information arrived. This allows the system 10 to amend faulty classifications.

Referring back to FIG. 1, transmitter 40 is arranged to direct radiation pulses towards an interior of the bin at different points of time during an content changing process selected out of an emptying process of the content and a filling process of the content; receiver 50 is arranged to receive echoes of the radiation pulses and to generate detection signals that are indicative of a time of arrival and of a direction of arrival of the echoes; and obstacle detector 20 may be arranged to detect an obstacle in response to a reception of echoes of radiation pulses that are have substantially a same time of arrival and a same direction of arrival throughout the content changing process. It is noted that this system may or may not include the location estimator 30.

FIGS. 3A-3C and especially the reception of obstacle echo 120 at the same time of arrival at scenario as well as changed of the time of arrival of content echoes 112 and 114 allows the obstacle detector 20 to differentiate between echoes resulting from obstacles and echoes resulting from content.

Figure 6:
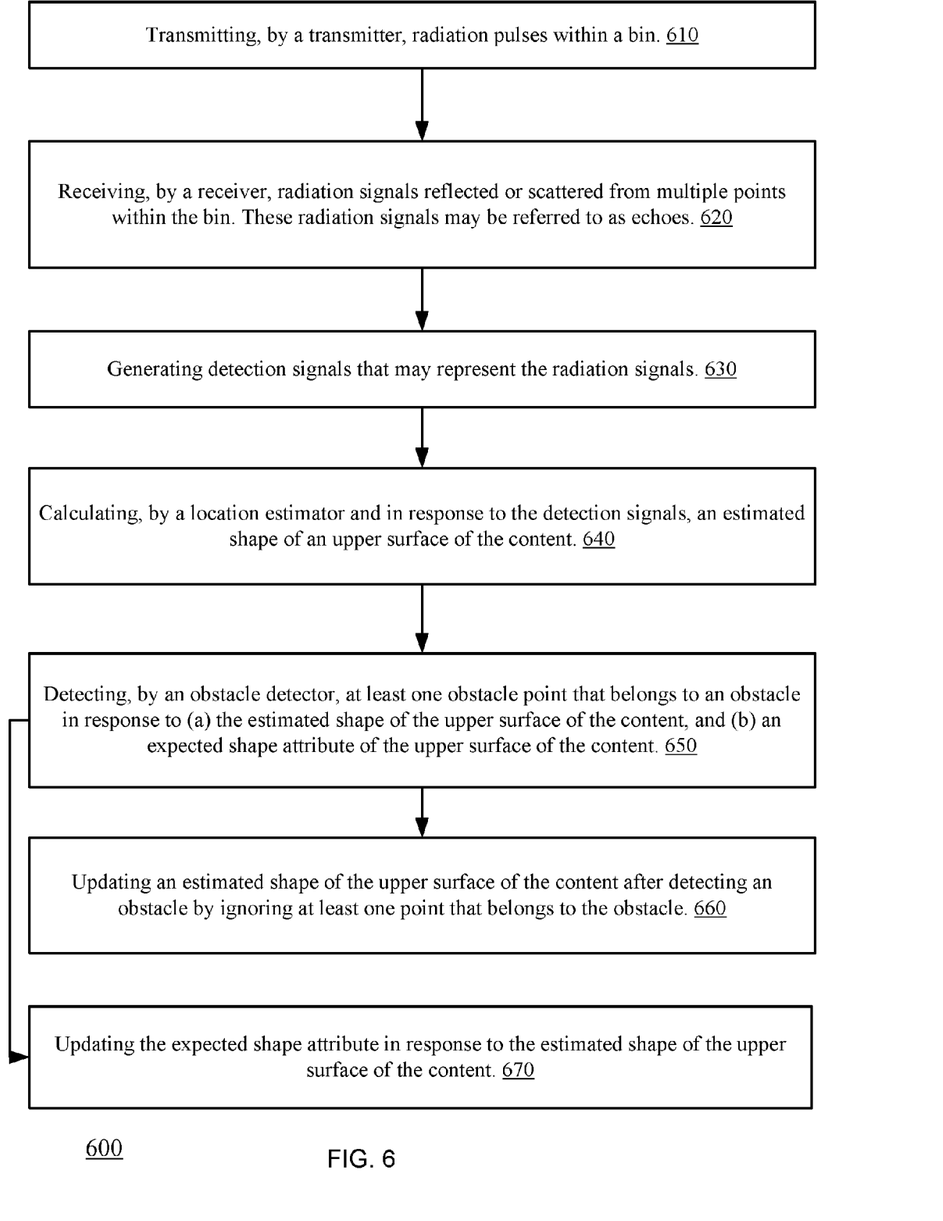
FIG. 6 illustrates a method according to an embodiment of the invention.

FIG. 6 illustrates method 600 for automatically mapping obstacles within a bin that stores content, according to an embodiment of the invention.

Method 600 may start by stage 610 of transmitting, by a transmitter, radiation pulses within a bin.

Stage 610 may be followed by stage 620 of receiving, by a receiver, radiation signals reflected or scattered from multiple points within the bin. These radiation signals may be referred to as echoes.

Stage 620 may be followed by stage 630 of generating detection signals that may represent the radiation signals.

It is noted that stages 610-630 are optional and method 600 may start by receiving the detection signals.

Stage 630 may be followed by stage 640 of calculating, by a location estimator and in response to the detection signals, an estimated shape of an upper surface of the content.

Stage 640 may be followed by stage 650 of detecting, by an obstacle detector, at least one obstacle point that belongs to an obstacle in response to (a) the estimated shape of the upper surface of the content, and (b) an expected shape attribute of the upper surface of the content. It is noted that in some points in time the estimated shape may be indicative of an obstacle (curve 91(c) of FIG. 4) and in some cases it is indicative of an obstacle (curve 91(b) of FIG. 2B).

The expected shape attribute may define a maximal expected slope of the upper surface of the content, may refer to the roughness of the upper surface, to the presence (or lack of presence) of edges (obstacle 11 can have much sharper edges than content), and the like.

Stage 650 may include detecting an obstacle if a local slope of the estimated shape of the upper surface of the content exceeds the maximal expected slope.

The local slope may be defined between a group of points within the bin, and stage 650 may include selecting, out of the group of points, one or more obstacle points that belong to an obstacle.

Stage 650 may include selecting the one or more obstacle points in response to relative estimated heights of the points of the group of points. The selection may include selecting one or more highest point of the group of points as being the one or more obstacle points.

Stage 650 may, additionally or alternatively, include selecting the one or more obstacle points in response to strengths of reflections from the points of the group of points.

Stage 650 may be followed by stage 660 of updating an estimated shape of the upper surface of the content after detecting an obstacle by ignoring at least one point that belongs to the obstacle.

Stage 650 may be followed by stage 670 of updating the expected shape attribute in response to the estimated shape of the upper surface of the content.

The stages of method 600 can be executed in a repetitive manner over multiple periods of time.

Figure 7:
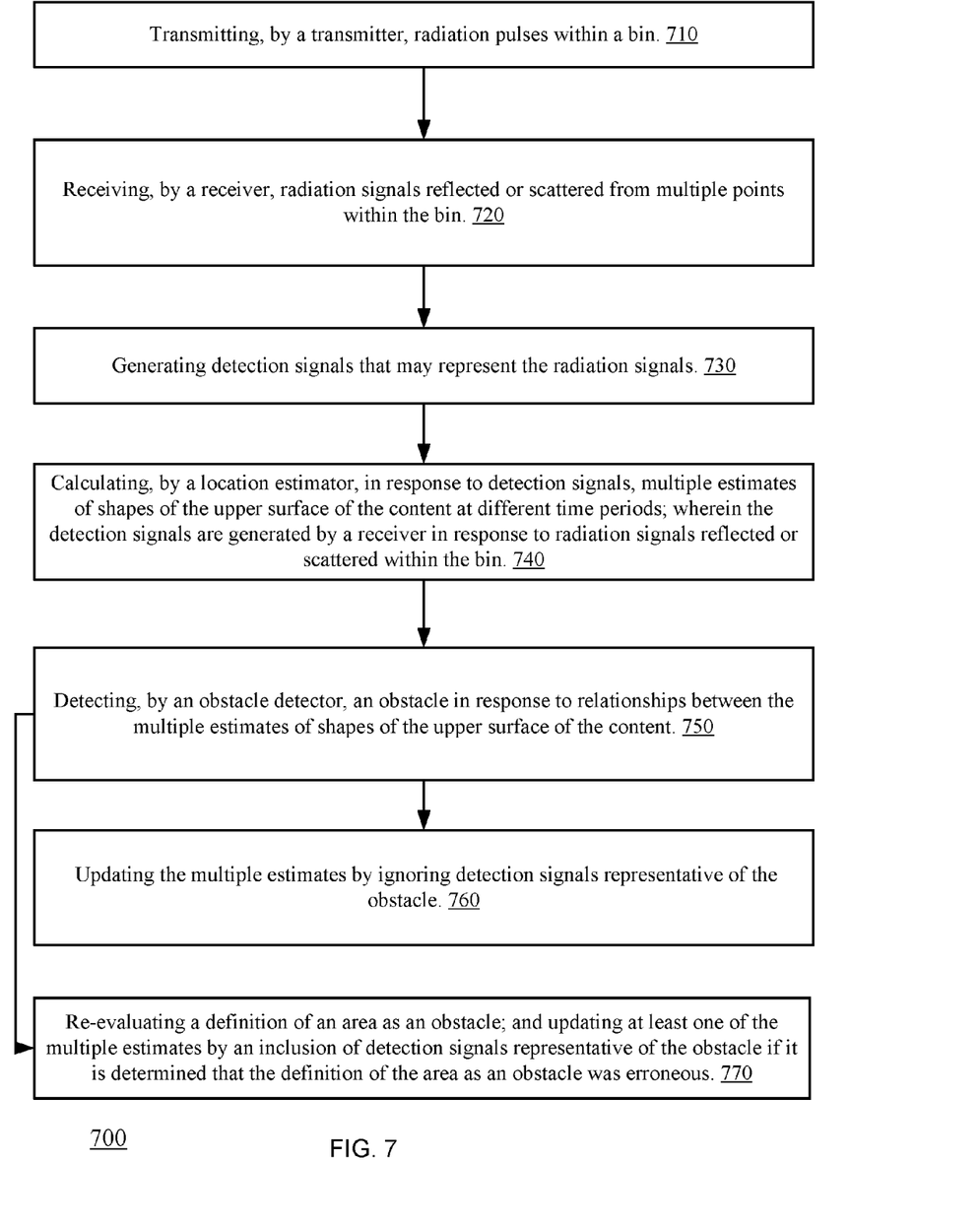
FIG. 7 illustrates a method according to an embodiment of the invention.

FIG. 7 illustrates method 700 for automatically mapping obstacles within a bin that stores content, according to an embodiment of the invention.

Method 700 may start by stage 710 of transmitting, by a transmitter, radiation pulses within a bin.

Stage 710 may be followed by stage 720 of receiving, by a receiver, radiation signals reflected or scattered from multiple points within the bin. These radiation signals may be referred to as echoes.

Stage 720 may be followed by stage 730 of generating detection signals that may represent the radiation signals.

Stage 730 may be followed by stage 740 of calculating, by a location estimator, in response to detection signals, multiple estimates of shapes of the upper surface of the content at different time periods; wherein the detection signals are generated by a receiver in response to radiation signals reflected or scattered within the bin.

Stage 740 may be followed by stage 750 of detecting, by an obstacle detector, an obstacle in response to relationships between the multiple estimates of shapes of the upper surface of the content.

Stage 750 may include defining an obstacle as an area that remains substantially unchanged at a plurality of estimates despite substantial differences of other areas of the plurality of estimates.

A non-limiting example of such a comparison is illustrated in FIG. 5—the differences between estimates 93(a)-93(d) and especially the differences between areas 95(a)-95(d) versus the lack of changes between areas 94(a)-94(d) indicate that areas 94(a)-94(d) represent obstacle 11.

Stage 740 may include detecting an addition of content to the bin and stage 750 may include detecting an obstacle as an area that remains unchanged despite the addition of the content.

Stage 740 may include detecting a removal of content to the bin and stage 750 may include detecting an obstacle as an area that remains unchanged despite the addition of the content.

Stage 750 may be followed by stage 760 of updating the multiple estimates by ignoring detection signals representative of the obstacle. A non-limiting example is provided by curves 91(c) and 92(c) of FIG. 4.

Stage 750 may be followed by stage 770 of re-evaluating a definition of an area as an obstacle; and updating at least one of the multiple estimates by an inclusion of detection signals representative of the obstacle if it is determined that the definition of the area as an obstacle was erroneous.

The stages of method 700 can be executed in a repetitive manner over multiple periods of time.

Figure 8:
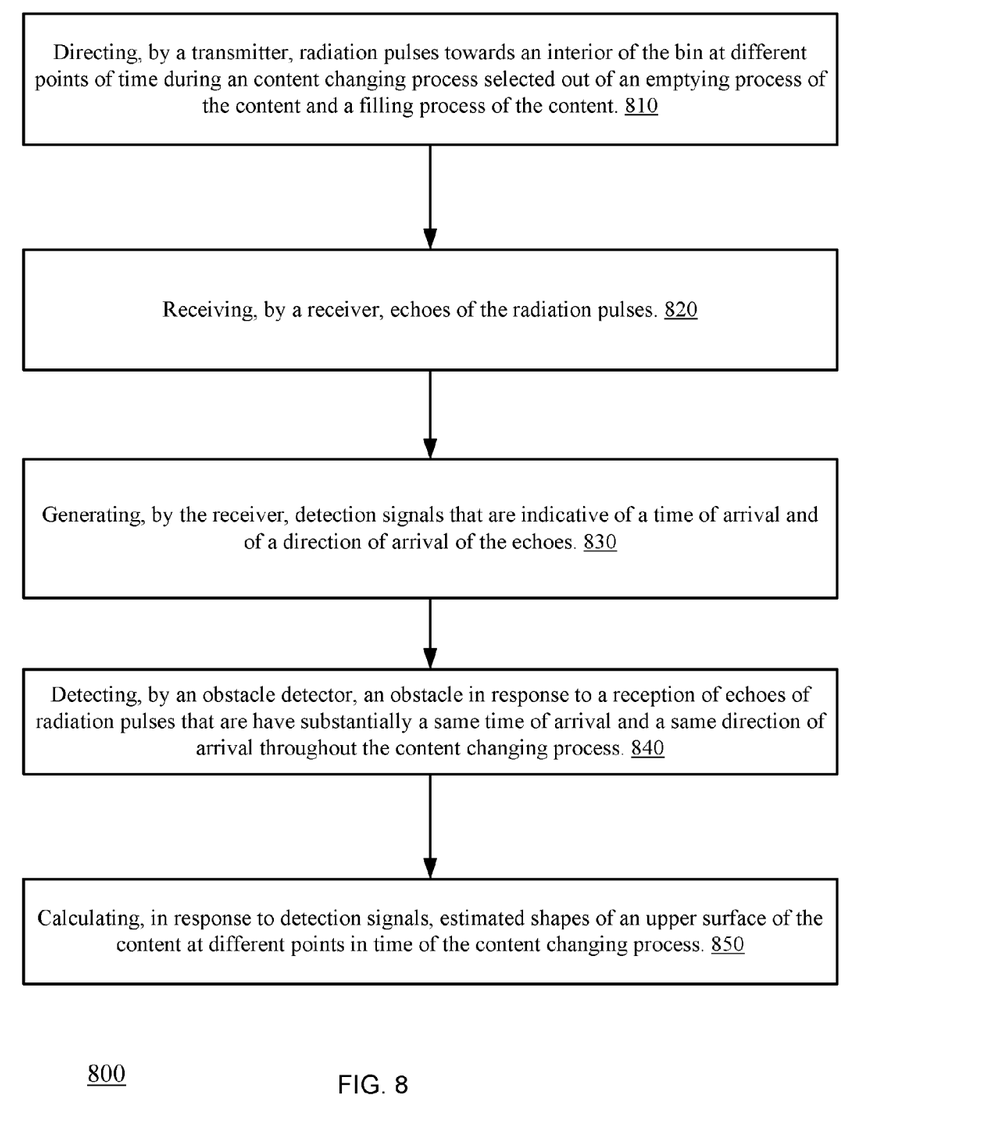
FIG. 8 illustrates various stages of a method according to an embodiment of the invention.

FIG. 8 illustrates method 800 for automatically mapping obstacles within a bin that stores content, according to an embodiment of the invention.

Method 800 may start by stage 810 of directing, by a transmitter, radiation pulses towards an interior of the bin at different points of time during an content changing process selected out of an emptying process of the content and a filling process of the content.

Stage 810 may be followed by stage 820 of receiving, by a receiver, echoes of the radiation pulses.

Stage 820 may be followed by stage 830 of generating, by the receiver, detection signals that are indicative of a time of arrival and of a direction of arrival of the echoes.

Stage 830 may be followed by stage 840 of detecting, by an obstacle detector, an obstacle in response to a reception of echoes of radiation pulses that are have substantially a same time of arrival and a same direction of arrival throughout the content changing process. The detection can include comparing echoes obtained over time as those illustrated in FIGS. 3A-3C.

Stage 840 may also be followed by stage 850 of calculating, in response to detection signals, estimated shapes of an upper surface of the content at different points in time of the content changing process.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A system for automatically mapping obstacles within a bin that stores content, the system comprising:
    a location estimator that is arranged to calculate, in response to detection signals, multiple estimates of shapes of the upper surface of the content at different time periods;
    wherein the detection signals are generated by a receiver in response to radiation signals reflected or scattered within the bin; and
    an obstacle detector that is arranged to
    (a) detect an obstacle as an area that remains substantially unchanged at two or more estimates of the multiple estimates despite substantial differences of other areas of the two or more estimates;
    (b) update the multiple estimates by ignoring detection signals representative of the obstacle; and
    (c) re-evaluate a definition of an area as an obstacle and to update at least one of the multiple estimates by an inclusion of detection signals representative of the obstacle if it is determined that the definition of the area as an obstacle was erroneous.

2. The system according to claim 1, comprising an acoustic transceiver; wherein the acoustic transceiver comprises the receiver and a transmitter.

3. The system according to claim 2 wherein the acoustic transceiver comprises a pulse shaper, a modulator, a transducer, a demodulator, a pulse compressor and a post processor.

4. The system according to claim 1 comprising collinear acoustic transceivers, the collinear acoustic transceivers comprise the receiver.

5. The system according to claim 1, wherein the obstacle detector is arranged to detect an addition of content to the bin and is arranged to detect an obstacle as an area that remains unchanged despite the addition of the content.

6. The system according to claim 1, wherein the obstacle detector is arranged to detect a removal of content from the bin and is arranged to detect an obstacle as an area that remains unchanged despite the removal of the content.

7. The system according to claim 1, comprising the receiver.

8. The system according to claim 1, wherein the detection signals are echoes of acoustic pulses.

9. A method for automatically mapping obstacles within a bin that stores content, the method comprising:
calculating, by a location estimator, in response to detection signals, multiple estimates of shapes of the upper surface of the content at different time periods; wherein the detection signals are generated by a receiver in response to radiation signals reflected or scattered within the bin; and
detecting, by an obstacle detector, an obstacle as an area that remains substantially unchanged at two or more estimates of the multiple estimates despite substantial differences of other areas of the two or more estimates;
re-evaluating a definition of an area as an obstacle; and updating at least one of the multiple estimates by an inclusion of detection signals representative of the obstacle if it is determined that the definition of the area as an obstacle was erroneous.

10. The method according to claim 9, comprising transmitting acoustic pulses by a transmitter towards an interior of the bin; and wherein the radiation signals that are reflected or scattered within the bin are echoes of the acoustic pulses.

11. The method according to claim 10 wherein the transmitter and the receiver belong to collinear acoustic transceivers.

12. The method according to claim 9 comprising generating a baseband pulse from a kernel, modulating a carrier wave with the baseband pulse; and launching by a transducer, a modulated carrier wave, into a medium that supports a propagation of the modulated carrier wave, as a transmitted acoustic pulse.

13. The method according to claim 9, comprising detecting an addition of content to the bin and is arranged to detecting an obstacle as an area that remains unchanged despite the addition of the content.

14. The method according to claim 9, comprising detecting a removal of content to the bin and detecting an obstacle as an area that remains unchanged despite the addition of the content.

15. The method according to claim 9, comprising generating by the receiver the detection signals.

16. The method according to claim 9, comprising receiving an echo of an acoustic pulse by the receiver, demodulating the echo to provide a received representation of the baseband pulse; compressing the representation of the baseband pulse by de-convolution to provide a compressed pulse; and inferring a range to multiple points of the upper surface of the content in response to the compressed pulse.

17. A system for automatically mapping obstacles within a bin that stores content, the system comprising:
a transmitter that is arranged to direct radiation pulses towards an interior of the bin at different points of time during an content changing process selected out of an emptying process of the content and a filling process of the content;
a receiver that is arranged to receive echoes of the radiation pulses and to generate detection signals that are indicative of a time of arrival and of a direction of arrival of the echoes; and
an obstacle detector that is arranged to detect an obstacle as an area that reflects or scatters echoes of radiation pulses that are have substantially a same time of arrival and a same direction of arrival throughout the content changing process.

18. The system according to claim 17 wherein the radiation pulses are acoustic pulses.

19. The system according to claim 17, comprising a location estimator that is arranged to calculate, in response to detection signals, estimated shapes of an upper surface of the content at different points in time of the content changing process.

20. A method for automatically mapping obstacles within a bin that stores content, the method comprising:
directing, by a transmitter, radiation pulses towards an interior of the bin at different points of time during an content changing process selected out of an emptying process of the content and a filling process of the content;
receiving, by a receiver, echoes of the radiation pulses;
generating, by the receiver, detection signals that are indicative of a time of arrival and of a direction of arrival of the echoes; and
detecting, by an obstacle detector, an obstacle as an area that reflects or scatters echoes of radiation pulses that are have substantially a same time of arrival and a same direction of arrival throughout the content changing process.

21. The method according to claim 20 wherein the radiation pulses are acoustic pulses.

22. The method according to claim 20, comprising calculating, in response to detection signals, estimated shapes of an upper surface of the content at different points in time of the content changing process.

23. A non-transitory computer readable medium that stores instructions to be executed by a computerized system, the instructions are for: calculating, by a location estimator, in response to detection signals, multiple estimates of shapes of the upper surface of the content at different time periods; wherein the detection signals are generated by a receiver in response to radiation signals reflected or scattered within the bin;
and detecting, by an obstacle detector, an obstacle as an area that remains substantially unchanged at two or more estimates of the multiple estimates despite substantial differences of other areas of the two or more estimates; re-evaluating a definition of an area as an obstacle; and updating at least one of the multiple estimates by an inclusion of detection signals representative of the obstacle if it is determined that the definition of the area as an obstacle was erroneous.

* * * * *